United States Patent [19]

David et al.

[11] Patent Number: 4,760,605

[45] Date of Patent: Jul. 26, 1988

[54] IMAGE SIGNAL PROCESSING WITH FILTERING TO ACCOUNT FOR IMAGE MAPPING

[75] Inventors: Morgan W. A. David, Farnham; David J. Hedley, Winchester; John W. Richards, Chilbolton, all of England

[73] Assignee: Sony Corporation, Tokyo, Japan

[21] Appl. No.: 926,573

[22] Filed: Nov. 4, 1986

[30] Foreign Application Priority Data

Nov. 19, 1985 [GB] United Kingdom ................. 8528442

[51] Int. Cl.$^4$ .............................................. G06K 9/00
[52] U.S. Cl. ...................................... 382/47; 358/22; 358/37; 358/166; 382/54
[58] Field of Search ...................... 382/54, 44, 46, 47; 358/22, 36, 37, 166, 167

[56] References Cited

U.S. PATENT DOCUMENTS

| | | | |
|---|---|---|---|
| 4,432,009 | 2/1984 | Reitmeier et al. | 358/22 |
| 4,578,812 | 3/1986 | Yui | 382/47 |
| 4,602,285 | 7/1986 | Beaulier et al. | 382/47 |
| 4,652,908 | 3/1987 | Fling et al. | 358/37 |
| 4,656,515 | 4/1987 | Christopher | 358/22 |
| 4,660,081 | 4/1987 | Heerah | 358/22 |
| 4,665,433 | 5/1987 | Hinson et al. | 358/22 |
| 4,672,463 | 6/1987 | Tomohisa et al. | 382/54 |

Primary Examiner—Leo H. Boudreau
Attorney, Agent, or Firm—Lewis H. Eslinger

[57] ABSTRACT

An image signal processing apparatus comprises a memory (12) and an address generator (14) that generates addresses for allocation to successive words of a digital input signal (10) representing an input image for mapping those words (or words obtained by interpolation therefrom) into the memory (12) in such a manner that individual portions of the mapped image stored in the memory may be compressed and/or rotated with respect to corresponding portions of the input image. A digital filter (40) of variable bandwidth effects two-dimensional filtering of the image before it is stored in the memory (12). Local scaling factor computation means (42) monitors the addresses allocated by the address generator (14) to successive sets of words of the input signal corresponding to successive local image areas and computes from each set of addresses, for the corresponding set of words, a local scaling factor representing the extent of compression and/or rotation of the local area. Bandwidth control means (44) is responsive to the successive local scaling factors computed by the computation means (44) to vary the bandwidth of the filter (40) in a sense to minimize aliasing that would be caused by compression and/or rotation of the local areas.

14 Claims, 5 Drawing Sheets

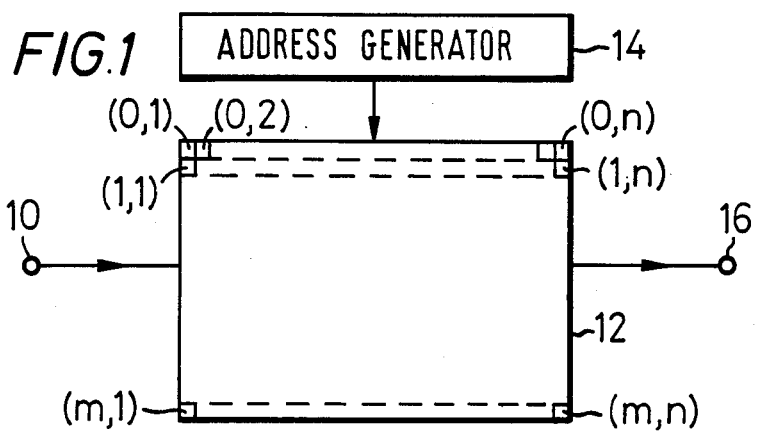
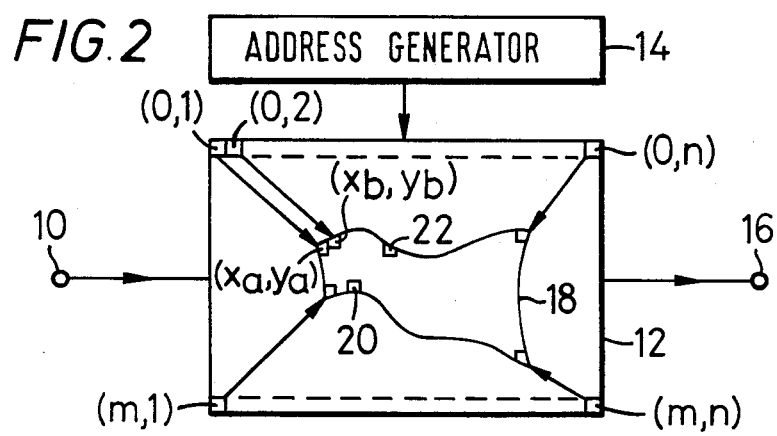
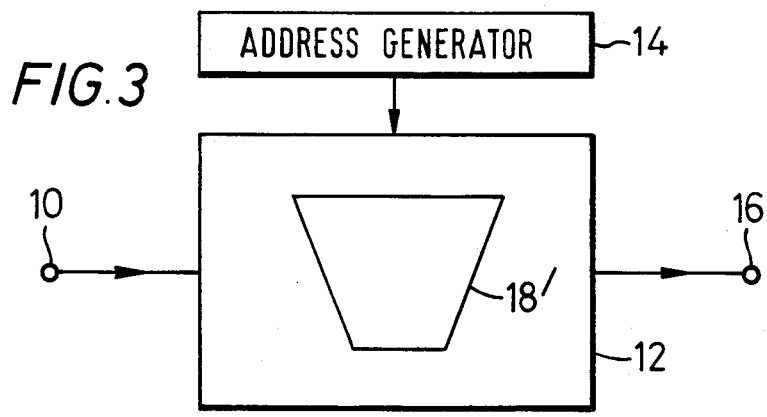

IMAGE SIGNAL PROCESSING WITH FILTERING TO ACCOUNT FOR IMAGE MAPPING

BACKGROUND OF THE INVENTION

1. Field of the Invention

This invention relates to image signal processing apparatus and methods.

2. Description of the Prior Art

It has been proposed to manipulate an image signal in the spatial domain by mapping words of the signals into a memory in such a manner that, when the mapped image is read out from the memory, it will have been manipulated by virtue of the mapping process in a manner dictated by the mapping function that is employed in carrying out the process. Such a technique may, for example, be employed in the creation of digital video effects.

The mapping process may involve compression and/or rotation of the image. Moreover, the extent of compression and/or rotation may vary from area to area of the mapped image. As is explained in more detail below, both compression and rotation may lead to aliasing, which will cause degradation of the image.

SUMMARY OF THE INVENTION

The present invention is directed to preventing or at least minimizing aliasing of an image signal due to compression and/or rotation caused by the above-mentioned mapping process.

An object of the invention is to prevent or at least minimize aliasing of an image signal due to compression of the image caused by mapping of the image into a memory.

Another object of the invention is to prevent or at least minimize aliasing of an image signal due to rotation of the image caused by mapping of the image into a memory.

A further object of the invention is to prevent or at least minimize aliasing of an image signal due to compression and rotation of the image caused by mapping of the image into a memory.

A more specific object of the invention is to prevent or at least minimize aliasing of an image signal due to different extents of compression and/or rotation of the image over different local areas thereof caused by mapping of the image into a memory.

Yet another object of the invention is to prevent or at least minimize aliasing of an image signal due to compression and/or rotation of the image, caused by mapping the image into a memory in accordance with a mapping function, in such a manner as to be independent of the particular mapping function employed.

The invention provides an image signal processing apparatus comprising a memory and means for generating addresses for allocation to successive words of a digital input signal representing an input image for mapping the image (for instance the above-mentioned words of the image signal or words obtained by interpolation therefrom) into the memory in such a manner that individual portions of the mapped image stored in the memory may be compressed and/or rotated with respect to corresponding portions of the input image. The apparatus further comprises a digital filter of variable bandwidth that effects two-dimensional filtering of the image, local scaling factor computation means that monitors the addresses allocated to successive sets of words of the input signal corresponding to successive local image areas and computes from each set of addresses, for the corresponding set of words, a local scaling factor representing the extent of compression and/or rotation of the corresponding local area, and bandwidth control means responsive to the successive local scaling factors to vary the bandwidth of the digital filter in a sense to minimize aliasing that would be caused by compression and/or rotation of the local areas.

The invention also provides an image signal processing method in which addresses are generated for allocation to successive words of a digital input signal representing an input image for mapping the image (for instance the above-mentioned words or words obtained by interpolation therefrom) into a memory in such a manner that individual portions of the mapped image stored in the memory may be compressed and/or rotated with respect to corresponding portions of the input image. Two-dimensional filtering of the image is carried out by means of a digital filter of variable bandwidth. The addresses allocated to successive sets of words of the input signal corresponding to successive local image areas are monitored and a local scaling factor, representing the extent of compression and/or rotation of the corresponding local area, is computed from each set of addresses, for the corresponding set of words. The bandwidth of the digital filter is varied in response to the successive local scaling factors in a sense to minimize aliasing that would be caused by compression and/or rotation of the local areas.

The apparatus and method not only minimize aliasing due to compression and/or rotation, but take account of the fact that the degree or extent of compression and/or rotation can vary over the mapped image and match the filtering (specifically, the bandwidth of the filter) optimally to that required for each local area of the image. Further, by virtue of the fact that the local scaling factor is computed from the allocated addresses, the apparatus will operate regardless of the particular mapping function that is employed.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 1 to 3 are schematic views of an image signal processing apparatus for mapping a digital image signal into a memory so that the image can be manipulated in the spatial domain, FIG. 1 showing a case in which the image is not manipulated and FIGS. 2 and 3 showing respective different forms of mapping/manipulation;

DESCRIPTION OF THE PREFERRED EMBODIMENTS

Figure 4:
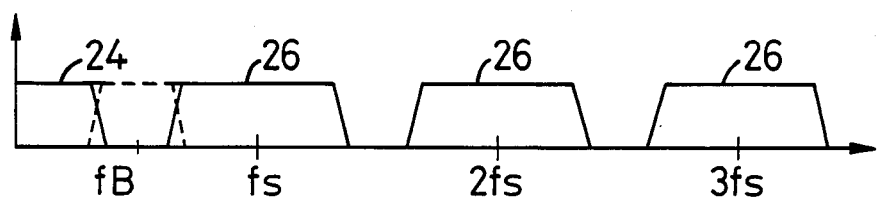
FIG. 4 shows the frequency response of a sampled image signal in the frequency domain, that is it is a graph of amplitude v. frequency (Hz), and shows how image compression can cause aliasing.

In the art of image signal manipulation, for example in the creation of digital video effects, it has been proposed to map an image signal into a memory in accordance with a desired mapping function in order to manipulate or transform the image into a desired form. FIG. 1 shows, in outline, an image signal processing apparatus that enables this to be accomplished. An input image or picture signal is applied to an input port or terminal 10 of a memory shown schematically at 12. The input image signal comprises a sequence of digital words (for example 8 bit words) which may comprise digitized samples (sampling frequency or rate fs) of, for example, a raster scan video signal obtained, for instance, from a television camera. The memory 12, which may for example be a field store or a frame store in the case of a video signal, is operative to store or write the respective input words or samples in respective locations of the memory in accordance with addresses allocated to the respective samples by an address generator 14. The address generator 14 generates addresses at the frequency fs in accordance with a mapping function so as to map the samples into the memory 12 in such a manner that, when the contents of the memory are read out to produce an output image signal at the frequency fs on an output port or terminal 16, the output picture or image represented by the output image signal will have been manipulated in appearance, as compared to the input picture or image, in a manner determined by the mapping function, so as to achieve a desired visual effect.

The operation of the arrangement of FIG. 1 will now be described in more detail, considering first a case in which the addresses generated by the address generator 14 are such that no image manipulation is achieved. The address allocated to each sample of the input signal comprises information in coded-bit form which represents or points to the x and y coordinates of a memory location in an x,y coordinate system of which the upper left hand corner of the memory 12 as represented in FIG. 1 can be considered to constitute the origin. Thus, the first sample of the input image signal, which is the first sample of a first line of the image, is allocated an address pointing to a memory location (0,1), that is a memory location having the address coordinate: x=0, y=1. Successive samples of the first line are allocated addresses corresponding to the memory locations (0,2), (0,3) ... (0,n), where n is the number of samples per line. The samples of successive lines are allocated addresses (1,1) to (1,n), (2,1) to (2,n) and so forth, up to (m,1) to (m,n) for the last line, where m is the number of lines in the image. At this point, the whole image (for example one field or frame of a video signal) has been stored. The stored image then is read out by outputting the contents of the memory locations in the order (0,1) to (0,n), (1,1) to (1,n) ... (m,1) to (m,n). As will be apparent, the output image represented by the output image signal is in this case an unmanipulated representation of the input image.

It should, of course, be appreciated that the relative dispositions of the respective memory locations in FIG. 1 are shown schematically and that they need not in practice be relatively disposed in the manner shown in FIG. 1.

A description will now be given, with reference to FIG. 2, of a case in which the input image is manipulated. In this case, the input image is to be manipulated so that the output image will appear within an area 18 shown in FIG. 2. The area 18, which has been selected arbitrarily to illustrate by way of example the points discussed below, can be considered, for ease of understanding, as a "still" perspective representation of a fluttering flag (and in the case of a video signal could be changed for successive fields or frames so that the image is manipulated in such a manner that its plane is distorted to lie on the surface of a moving fluttering flag). Thus, a three-dimensional effect is achieved.

The address generator 14 is operative in this case to map the successive input samples into memory locations corresponding to the area 18. Thus, the first sample is not in this case stored in the memory location (0,1), but instead is stored in a location $(x_a, y_a)$. Similarly, the next sample is not stored in the location (0,2), but is stored in a location $(x_b, y_b)$; and so on. When the image is read out, the memory locations are read in the same order as in the case of FIG. 1, namely in the order (0,1) to (0,n), (1,1) to (1,n) ... (m,1) to (m,n). Consequently, the output image has been manipulated in that an image which, in the absence of manipulation, would have conformed to the border of the memory 12 as represented in FIG. 2, will instead adopt the form represented by the area 18.

The output image has been subjected to manipulation of two types, namely (i) compression and (ii) rotation.

Considering first compression, in the example illustrated in FIG. 2 the image has been compressed (reduced in size) with respect to the original image in both the horizontal direction (along the lines of the original or input image) and the vertical direction (transverse to the lines of the original or input image). Overall, in both directions, the degree of compression in both directions is about 2:1. However, the degree of compression in either or both directions varies over the area 18. That is, it will in general be lesser over portions of the area intended to appear relatively near to the viewer and greater over portions of the area intended to appear further from the viewer. More generally, the degree of extent of compression (also referred to herein as the "scaling factor") is, at least in general, specific to small portions of the image. This can perhaps more readily be appreciated by an inspection of FIG. 3, which shows a case in which the input image is mapped on to an area 18' to give an effect equivalent to a perspective view of the input image plane. It will be seen that in this case the horizontal scaling factor (the degree of compression in the horizontal direction) increases in the downward direction.

With regard to rotation, it will be evident that, for example, a portion of the area 18 indicated at 20 in FIG. 2 is subjected to little or no rotation with respect to the corresponding portion of the input picture, whereas a portion indicated at 22 has been rotated by about 45°.

As will now be described in detail, in the absence of corrective measures both compression and rotation of the picture can give rise to aliasing, which will degrade the quality of the output image.

Aliasing due to compression will be considered first. As is known to those skilled in the art, an image can be characterised by a two-dimensional parameter known as spatial frequency, which is proportional to the reciprocal to the angle subtended to the eye of the viewer by the visual spectral components of the image. The concept of spatial frequency can more readily be appreciated by considering an image in the form of a series of uniformly spaced straight lines. For a fixed position of the viewer with respect to such an image, the image has a single spatial frequency which is inversely proportional to the apparent spacing of the lines. (The spatial frequency is horizontal if the lines are spaced horizontally, vertical if the lines are spaced vertically, and diagonal in other cases). Clearly, if the image is compressed, so that the lines appear to the viewer to become closer together whereby the angle they subtend to the eye of the viewer decreases, the spatial frequency increases.

The scaling theorem in Fourier analysis states that if an image signal is compressed in the spatial domain, that is if the spatial frequency of the image is increased, then the Fourier transform of the signal increases in the frequency domain (that is, the frequency (in Hz) of the signal increases); and vice versa.

It will be recalled that the image signal discussed above is a sampled signal. Nyquist's Rule concerning the sampling of signals states that, in order not to lose information contained in a signal, the signal must be sampled at a frequency (fs) that is equal to at least twice the bandwidth (fB) of the signal. Naturally, this criterion is complied with when the digital input signal is formed initially by sampling an analog signal. The frequency spectrum (Fourier transform) of the sampled signal in the frequency domain is shown by the solid lines in FIG. 4, which is a graph of amplitude v. frequency (Hz). The frequency spectrum comprises a baseband component 24 (up to fB). Also, the baseband is reflected symmetrically around the sampling frequency fs and its harmonics 2fs, 3fs etc. to produce higher frequency components 26. Provided that Nyquist's Rule is complied with (so that fs/2 is greater than fB) and provided that the signal is band-limited (low-pass filtered) so as to have a cut-off frequency of about fs/2, the higher frequency components 26 will be suppressed.

As explained above, when the sampled signal is subjected to compression in the spatial domain, its Fourier transform exhibits expansion in the frequency domain. Thus, the bandwidths of the components 24, 26 in FIG. 4 increase. As shown by dotted lines in FIG. 4, this can result in aliasing of the signal in that the bandwidth fB of the signal can exceed the Nyquist limit (fs/2) so that part of at least the lowest one of the higher frequency components 26 extends down into and is mixed with the baseband so as to degrade the signal and therefore the image that it represents.

Figure 5:
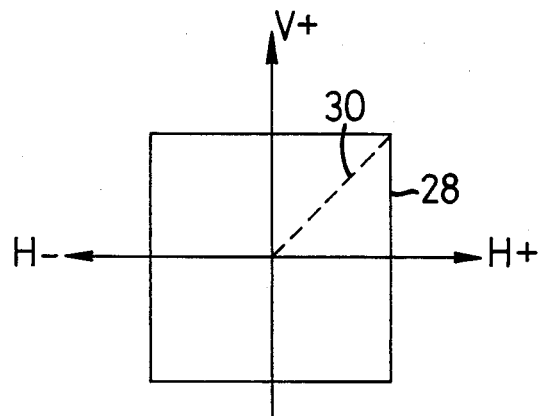
FIG. 5 shows the two-dimensional bandwidth in the spatial domain of a system for handling an image signal.

The phenomenon of aliasing due to rotation will now be described. As is known to those skilled in the art, the bandwidth of a system for handling the two-dimensional (vertical/horizontal) sampled image signal can be represented in the spatial domain by a two-dimensional frequency response as represented in FIG. 5. In FIG. 5, the horizontal axis represents a scale of horizontal spatial frequency in the positive and negative senses (H+ and H−) in units of cycles per picture width, the vertical axis represents a scale of vertical spatial frequency in the positive and negative senses (V+ and V−) in units of cycles per picture height, and the rectangle 28 represents the two-dimensional bandwidth of the system, the vertical and horizontal bandwidths being assumed to be approximately equal. It can be seen from FIG. 5 that diagonal frequencies (e.g. that shown at 30) of values higher than the vertical and horizontal bandwidths will fall within the two-dimensional bandwidth 28. If, for example, the vertical and horizontal bandwidths are equal, then diagonal frequencies of values up to $\sqrt{2}$ times the horizontal/vertical bandwidth fall within the two-dimensional bandwidth 28. However, as will now be explained, this holds true only if the image is not rotated.

Figure 6:
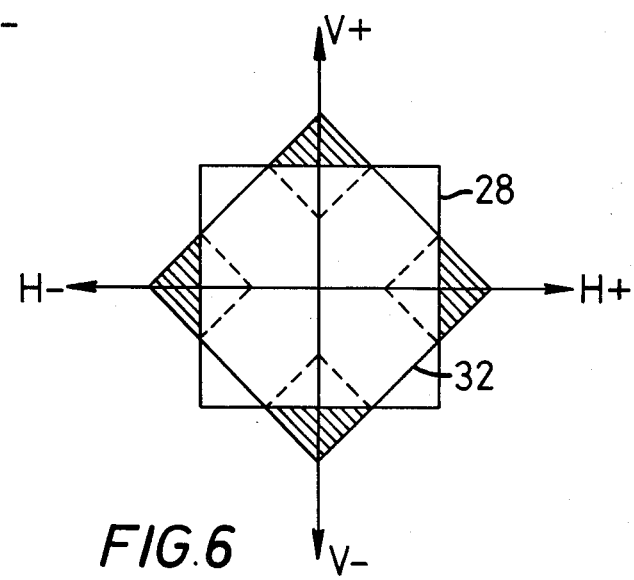
FIG. 6 repeats the showing of FIG. 5, but shows how rotation of the image can cause aliasing.

FIG. 6 repeats the showing of FIG. 5 and shows also the frequency space 32 of an image which would fall just within the bandwidth 28 (in both dimensions) if the image had not been rotated, but which in fact has been rotated through 45°. As will be seen, the corner regions (shown cross-hatched) of the frequency space 32 fall outside of the bandwidth 28 and therefore may exceed the Nyquist limit (fs/2) in the frequency domain, whereby they are reflected back into the bandwidth 28 (as shown by dotted lines) to mix with the baseband and cause aliasing in a generally similar manner to that explained above for the case of aliasing due to compression.

The extent of aliasing will depend upon the angle of rotation. If the horizontal and vertical bandwidths are the same, it will be appreciated that there is a maximum likelihood of aliasing for angles of rotation of 45°, 135°, 225° and 315° and a minimum likelihood of aliasing for angles of rotation of 0°, 90°, 180° and 270°.

An image signal processing apparatus embodying the invention and described hereinbelow with reference to FIGS. 7 to 10 is designed so as to eliminate or at least reduce aliasing due to local compression and/or rotation of the image by monitoring the addresses allocated to successive sets of at least three words or samples (spaced vertically and horizontally) corresponding to successive local areas of the image, computing from the addresses, for each such set of samples, a local scaling factor representing the extent of compression and/or rotation of the corresponding local area, and varying the bandwidth of the signal before it is mapped into the memory in accordance with the local scaling factor in a sense to minimise aliasing that otherwise would be caused by compression and/or rotation.

Figure 7:
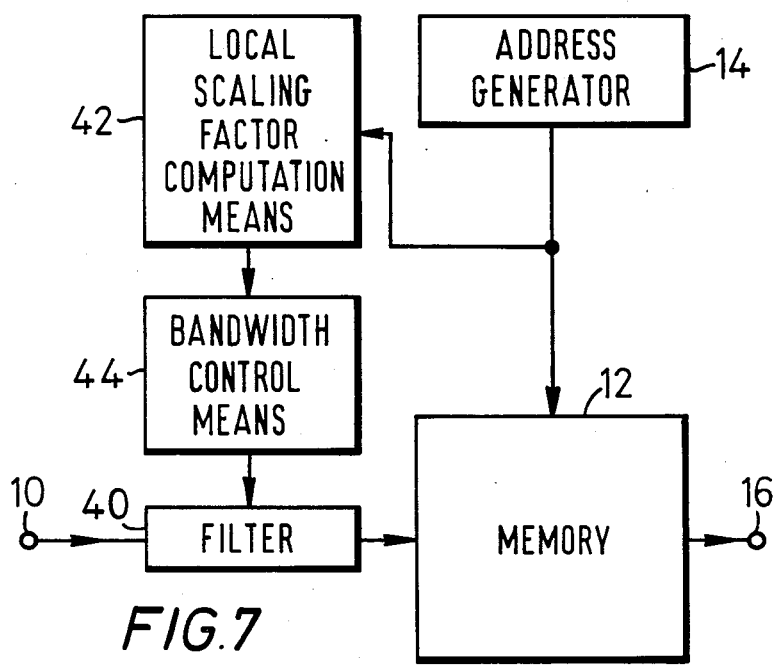
FIG. 7 is a block schematic diagram of an image signal processing apparatus embodying the present invention.

The image signal processing apparatus of FIG. 7 comprises, like the apparatus of FIG. 1, an input port or terminal 10, a memory 12, an address generator 14 and an output port or terminal 16, and is operative, like the apparatus of FIG. 1, to process a digital input image signal applied to the input port or terminal 10, by mapping it into the memory 12 in response to addresses produced by the address generator 14 in accordance with a mapping function, to produce a manipulated image output signal at the output port or terminal 16. Additionally, however, the apparatus of FIG. 7 includes a variable bandwidth digital filter 40 which is operative to effect two-dimensional filtering of the input signal before it is mapped into the memory 12, a local scaling factor computation means 42 connected to the address generator 14 to compute local scaling factors from the addresses allocated to successive sets of samples, as just described, and bandwidth control means 44 responsive to the successive computed local scaling factors to vary the bandwidth of the filter 40, as just described, in a sense to minimise aliasing due to local compression and/or rotation of the image. The apparatus includes also a clock signal source (not shown) operative to produce clock pulses at the sample rate fs so as to cause the various illustrated components of the apparatus to perform their respective functions during respective successive clock periods T each equal to 1/fs.

In FIG. 7, as in FIG. 1, the input samples comprise multi-bit words. The bits of each word of the input signal generally will arrive in parallel (at the frequency or rate fs). Also, the bits of words produced internally of the apparatus generally are transferred between the various elements of the apparatus in parallel. Further, bits of each word (sample) of the output signal generally will be generated in parallel. (The same applies to FIGS. 9 and 10 described below). Accordingly, it will be appreciated that items in FIGS. 7, 9 and 10 that are shown or described as lines generally will in fact be in the form of busses or highways.

Figure 9:
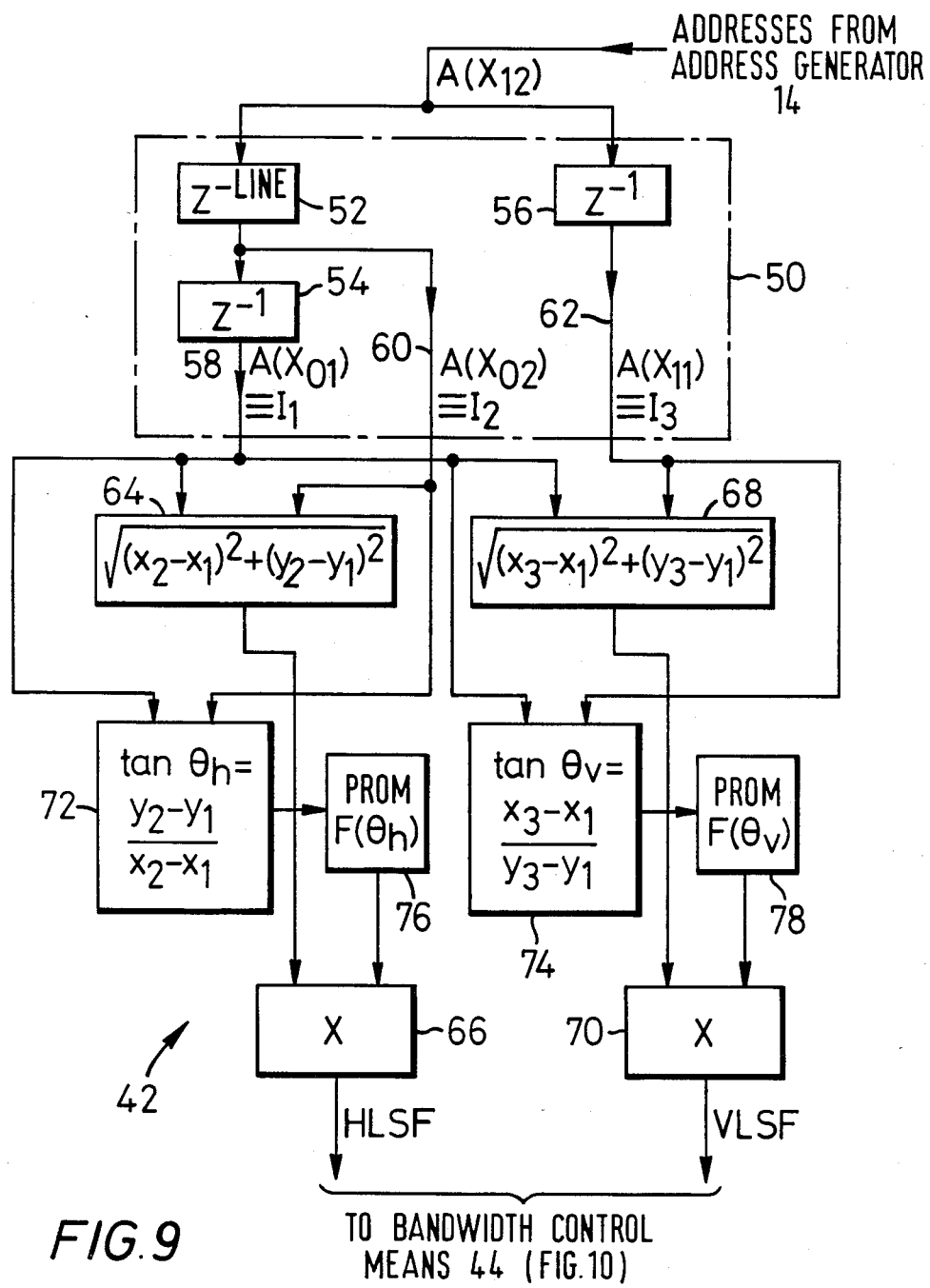
FIG. 9 is a block schematic diagram of a local scaling factor computation means of the apparatus of FIG. 7.
Figure 10:
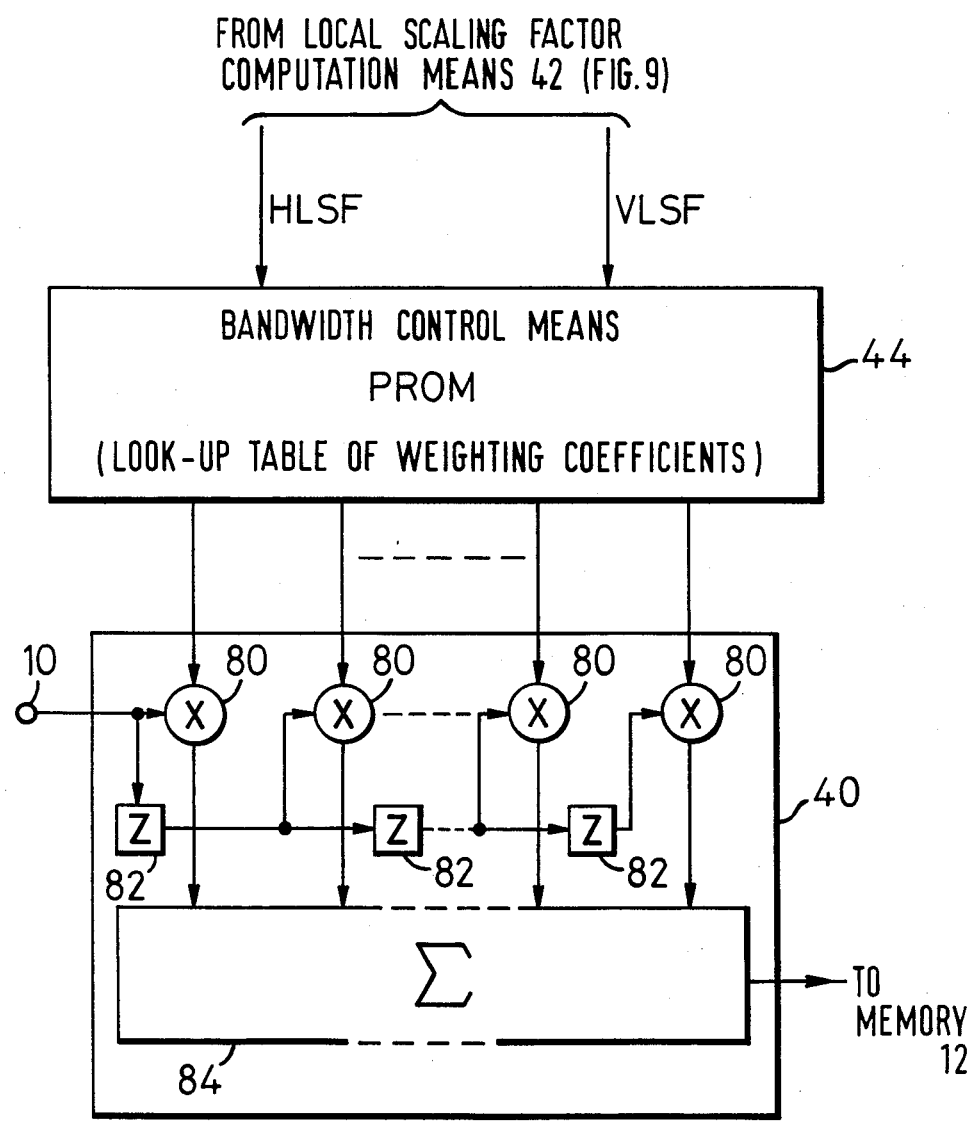
FIG. 10 is a block schematic diagram of a bandwidth control means and a variable bandwidth two-dimensional filter of the apparatus of FIG. 7.

A preferred form of implementation of the apparatus shown in FIG. 7 will be described hereinbelow with reference to FIGS. 9 and 10. Firstly, however, the principle of operation of the apparatus will be described with reference to FIG. 8.

Figure 8:
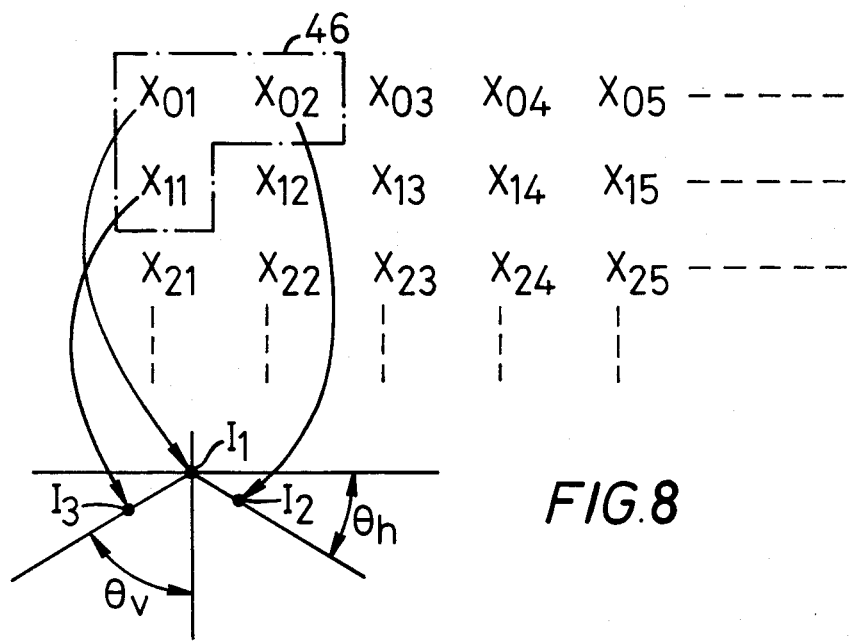
FIG. 8 is a diagram used for explaining the operations performed in a local scaling factor computation means of the apparatus of FIG. 7.

FIG. 8 is a representation of the samples (words) of the input signal. The samples $X_{01}$, $X_{02}$, $X_{03}$, $X_{04}$ etc. represent the samples of the first line of the image, the samples $X_{11}$, $X_{12}$, $X_{13}$, $X_{14}$ etc. represent the samples of the second line of the image, and so on. As explained above, a respective address is generated for each sample by the address generator 14, the address representing the x and y coordinates of a location in the memory 12 into which the sample is to be mapped. During each clock period, the local scaling factor computation means 42 is operative as explained above to compute a local scaling factor based upon the addresses allocated to a set of at least three samples corresponding to a local image area. Provided that the set includes two samples that are relatively spaced horizontally and two samples that are relatively spaced vertically (which two groups of two samples may include one sample in common so that a set of only three samples suffices), the words of the set may have any desired predetermined relative disposition. One convenient form of set comprises two adjacent samples in one line and a sample appearing exactly one line after the earlier sample in the first-mentioned line. In this case, the sets of addresses monitored in successive clock periods would be those corresponding to the words $X_{01}$, $X_{02}$, $X_{11}$; $X_{02}$, $X_{03}$, $X_{12}$; $X_{03}$, $X_{04}$, $X_{13}$ ... $X_{11}$, $X_{12}$, $X_{21}$; $X_{12}$, $X_{13}$, $X_{22}$; and so on, as represented, for the first such set, by the dotted line boundary 46 in FIG. 8.

Consider what happens when, for example, the set of samples 46, namely the samples $X_{01}$, $X_{02}$, $X_{11}$, is mapped to locations in the memory 12 represented in FIG. 8 as $I_1$, $I_2$ and $I_3$, respectively. The locations $I_1$, $I_2$ and $I_3$ are represented in FIG. 8 in their relative geometrical orientations in the output image and, as will be evident, the corresponding local image area has been subjected to rotation. It will be assumed also that the local image area has been subjected to compression in both the horizontal and vertical directions and that the extent or degree of compression (scaling factor) for each such direction differs from the other. Assume also that the x,y coordinates of the locations $I_1$, $I_2$ and $I_3$, as indicated by their addresses, are $(x_1,y_1)$, $(x_2,y_2)$ and $(x_3,y_3)$, respectively.

Simple trigonometry shows that the distance between the locations $I_1$ and $I_2$, which correspond to a pair of samples spaced horizontally by 1/fs (one pixel) in the input image, is given by:

$$\sqrt{(x_2 - x_1)^2 + (y_2 - y_1)^2}.$$

Accordingly, since the distance between the input samples $X_{01}$, $X_{02}$ corresponding to the locations $I_1$, $I_2$ is unity (one pixel), the degree of horizontal compression of the local area corresponding to the sample set 46 is given by:

$$\sqrt{(x_2 - x_1)^2 + (y_2 - y_1)^2}. \tag{1}$$

Similarly, it can be shown that the degree of vertical compression of the local area corresponding to the sample set 46 is given by:

$$\sqrt{(x_3 - x_1)^2 + (y_3 - y_1)^2}. \tag{2}$$

The bandwidth control means 44 is operative on the filter 40 during each clock period to reduce its horizontal and vertical bandwidths (as compared to the values of those bandwidths for the case when the image is not compressed) by the factors given in Equations (1) and (2), respectively, thereby preventing or at least reducing the generation of aliasing due to compression which otherwise would occur in the manner described above with reference to FIG. 4.

However, doing this alone would not prevent (or at least reduce) aliasing caused by rotation, which occurs for the reason explained above with reference to FIGS. 5 and 6. The prevention or reduction of aliasing due to rotation is accomplished as follows. The local scaling factor computation means 42 computes also the extent of rotation of the image. Specifically, it calculates the angle $\theta_h$ of the line $I_1$-$I_2$ to the horizontal and the angle $\theta_v$ of the line $I_1$-$I_3$ to the vertical, which angles indicate the amounts by which the local area has been rotated with respect to the horizontal and vertical, respectively, and which (in general) may not be the same. In practice, rather than computing $\theta_h$ and $\theta_v$, it is more convenient to calculate their tangents, since $\tan \theta_h$ and $\tan \theta_v$ can be computed easily from the addresses of the points $I_1$, $I_2$ and $I_3$ by the equations:

$$\tan \theta_h = \frac{y_2 - y_1}{x_2 - x_1}, \tag{3}$$

and $$\tan \theta_v = \frac{x_3 - x_1}{y_3 - y_1}. \tag{4}$$

Knowledge of the angles $\theta_h$ and $\theta_v$ (or their tangents) alone is not sufficient to deduce the amount of bandwidth reduction necessary to prevent aliasing due to rotation. As will be recalled from the explanation given above with reference of FIGS. 5 and 6, knowledge also is required of the likelihood of aliasing for the angle concerned. (For example, as indicated above, in the case of substantially equal horizontal and vertical bandwidths the likelihood of aliasing is maximum (and therefore maximum bandwidth reduction is required) if the angle if 45°, 135°, 225° or 315°, whereas the likelihood of aliasing is minimum (and therefore minimum bandwidth reduction is required) if the angle is 0°, 90°, 180° and 270°). It is possible for the local scaling factor computation means 42 to calculate, from the computed values of tan $\theta_h$ and tan $\theta_v$, corresponding values for $F(\theta_h)$ and $F(\theta_v)$, namely the reductions in the horizontal and vertical bandwidths, respectively, of the filter 40, needed to prevent aliasing due to rotation. Preferably, however, the computation means 42 contains look-up tables of $F(\theta_h)$ and $F(\theta_v)$ for various values of tan $\theta_h$ and tan $\theta_v$ and is operative to provide values of $F(\theta_h)$ and $F(\theta_v)$ appropriate to the calculated values of tan $\theta_h$ and tan $\theta_v$ by consulting the look-up tables.

Knowledge of both the compression bandwidth reduction factors as given by Equations (1) and (2) and of the rotation bandwidth reduction factors $F(\theta_h)$ and $F(\theta_v)$ enables the computation in the local scaling factor computation means 42 of horizontal and vertical scaling factors representing the extent by which the horizontal and vertical bandwidths of the filter 40 must be reduced (with respect to the values of those bandwidths when the image is neither compressed nor rotated) to prevent aliasing due to both compression and rotation. Specifically, the horizontal local scaling factor (horizontal bandwidth reduction factor) HLSF is given by $$HLSF = F(\theta_h)\sqrt{(x_2 - x_1)^2 + (y_2 - y_1)^2} \; ;$$

and the vertical local scaling factor (vertical bandwidth reduction factor) VLSF is given by $$VLSF = F(\theta_v)\sqrt{(x_3 - x_1)^2 + (y_3 - y_1)^2} \; .$$

A preferred form of implementation of the local scaling factor control means 42 will now be described with reference to FIG. 9. During each clock period $T(=1/fs)$, the address allocated by the address generator to the current input sample is passed to a delay network 50 comprising a $Z^{-LINE}$ delay element (line store) 52 and two $Z^{-1}$ delay elements (one sample delay elements) 54,56. The $Z^{-1}$ delay elements 54,56 may comprise latches that introduce a delay ($T=1/fs$) equal to one sample and the $Z^{-LINE}$ delay element 52 may comprise a series of latches that produce a delay ($n.T=n/fs$) equal to the number n of samples per line of the image. If the current input sample is $X_{12}$, then the address $A(X_{12})$ of that sample is applied to inputs of the delay elements 52 and 56. In this event, as will readily be appreciated from a study of the delay network 50, the addresses then produced on output lines 58,60,62 of the delay elements 54,52 and 56 are, respectively, the address $A(X_{01})$ allocated to the sample $X_{01}$ and therefore representing the position of the location $I_1$, the address $A(X_{02})$ allocated to the sample $X_{02}$ and therefore representing the position of the location $I_2$, and the address $A(X_{11})$ allocated to the sample $X_{11}$ and therefore representing the position of the location $I_3$. That is, at this time, the addresses on the output lines 58,60 and 62 contain all the information necessary to enable the horizontal and vertical scaling factors HLSF and VLSF for the local image area corresponding to the set of three words indicated at 46 in FIG. 8 to be calculated in accordance with Equations (1) to (6).

The output lines 58,60 are connected to a calculation block 64 that solves Equation (1) and passes the result to a first input of a multiplier 66. Similarly, the output lines 58,62 are connected to a calculation block 68 that solves Equation (2) and passes the result to a first input of a multiplier 70. Further, the output lines 58,60 are connected to a calculation block 72 that calculates tan $\theta_h$ in accordance with Equation (3) and the output lines 58,62 are connected to a calculation block 74 that calculates tan $\theta_v$ in accordance with Equation (4). Outputs of the calculation blocks 72,74 are passed to programmable read only memories (PROMs) 76 and 78, respectively, that store the above-mentioned look-up tables containing values of $F(\theta_h)$ and $F(\theta_v)$ for different values of $\theta_h$ and $\theta_v$ as calculated in the blocks 72 and 74. The PROMs 76 and 78 supply values of $F(\theta_h)$ and $F(\theta_v)$, respectively, appropriate to the calculated values of $\theta_h$ and $\theta_v$, to second inputs of the multipliers 66,70. The multipliers 66 and 70 multiply the values of $F(\theta_h)$ and $F(\theta_v)$ supplied by the PROMs 76,78 with the calculated values supplied by the calculation blocks 64,68 to calculate values for the horizontal and vertical local scaling factors HLSF and VLSF in accordance with Equations (5) and (6).

Thus, for each clock period T, the multipliers 66,70 supply values of HLSF and VLSF appropriate to a successive respective local image area corresponding to a set of three samples in the manner described generally above with reference to FIG. 8. As described above with reference to FIGS. 7 and 8, the values of HLSF and VLSF are supplied to the bandwidth control means 44 to control the vertical and horizontal bandwidths of the two-dimensional filter 40. Naturally, there is a propagation delay through the local scaling factor computation means 42 and also through the filter 40. It may therefore be necessary to incorporate a compensating delay somewhere in the apparatus to ensure the correct temporal relationship between the dynamic control of the filter bandwidth and the signal being filtered.

The bandwidth control means 44 and the two-dimensional (2D) filter 40 will now be described in more detail with reference to FIG. 10. The filter 40 can be of any suitable type. Preferably, however, a finite impulse response (FIR) type of filter is employed. The design of 2D FIR filters is known per se and therefore the preferred form of filter will not be described in great detail. As is known to those skilled in the art, a 2D-FIR filter is operative during each clock period T (=1/fs) to calculate a filtered output word or sample by multiplying a predetermined set of vertically and horizontally spaced samples of the input signal by respective weighting coefficients and summing the products of the multiplication operations. To this end, a 2D FIR filter generally will comprise a plurality of multipliers supplied with respective weighting coefficients, a plurality of $Z^{-1}$ delay elements (one sample delay elements) and $Z^{-LINE}$ delay elements (one line delay elements or line stores) arranged upstream or downstream of the multipliers to delay the samples of the input signal by different amounts to form the predetermined set of vertically and horizontally spaced samples, and a summing means to sum the delayed, weighted products. Since the filter 40 can be of a variety of configurations, it has been represented in a rather general and simplified form in FIG. 10 as comprising a plurality of multipliers 80, a plurality of delay elements 82 and a summing means 84. Respective different weighting coefficients are supplied to the multipliers 80 on lines 86 extending from the bandwidth means 44.

As is known to those skilled in the art, the vertical and horizontal bandwidths of a 2D FIR filter of a particular configuration depend upon the values chosen for the weighting coefficients. That is to say, the vertical and horizontal bandwidths of the filter 40 may be varied simply by varying the values of the weighting coefficients. To this end, the bandwidth control means may be responsive to the values of the horizontal and vertical local scaling factors HLSF and VLSF to compute appropriate values for the weighting coefficients to achieve a reduction in horizontal and vertical bandwidth of the filter 40 appropriate to the values of HLSF and VLSF. Preferably, however, a range of sets of weighting coefficient values appropriate to all possible values of HLSF and VLSF is computed at the design stage and the bandwidth control means 44 is implemented in the form of a PROM that stores a look-up table of the pre-computed sets of weighting coefficient values and outputs appropriate values of the weighting coefficients to the filter 40 at each clock period in accordance with the values of HLSF and VLSF received from the local scaling factor computation means 42.

It was explained above with reference to FIG. 8 that, for example, the set of samples 46, namely the samples $X_{01}$, $X_{02}$, $X_{11}$, is mapped to locations in the memory 12 represented in FIG. 8 as $I_1$, $I_2$ and $I_3$, respectively. Due to compression and/or rotation, the locations $I_1$, $I_2$ and $I_3$ may not correspond to exact pixel sites (discrete raster or array positions spaced by 1/fs) of the output image signal or output array. In practice, in the case of generation of digital video effects it is generally desirable that the locations in the memory 12 into which the words of the input signal are mapped should in fact correspond to exact pixel sites, since it is generally required that the output array should correspond to the input array.

One way of accomplishing this would be for the address generator 14 to generate, for each word of the input signal, an address representing the pixel site (memory position) that is closest to the position into which the mapping function indicates that the input word should be mapped. The input word therefore is mapped into that pixel site. Obviously, while this approach may be satisfactory, it would give rise to inaccuracy. An alternative approach would be for the address generator 14 to generate, for each word of the input signal, an address that indicates precisely (without restriction to exact pixel sites) the position into which the mapping function indicates that the word should be mapped. That address is passed to the local scaling factor computation means 42 for processing in the manner described above. The address comprises a major address portion representing the x and y coordinates of the pixel site that is closest to the position into which the mapping function indicates that the input word should be mapped, and a residual address portion representing the difference between the x and y coordinates of that pixel site and that position. Of these, only the major address position is supplied to the memory 12. Consequently, in this case also the input word is mapped into the closest pixel site. While this approach also may be satisfactory, it also will give rise to inaccuracy.

The above-mentioned inaccuracy can be overcome (or at least reduced) by adopting the following approach. As in the second of the approaches mentioned above, the full address is applied to the local scaling factor computation means 42 and the major address portion only is supplied to the memory 12. Additionally, however, the residual address portion is applied to interpolation means (not shown) which is positioned either before the filter 40 or between the filter 40 and the memory 12. The interpolation means is responsive to the value of the position increment from the closest pixel site, as represented by the residual address portion, to interpolate between the values of available input samples or words to produce, for each input sample or word, an interpolated sample or word which corresponds to that point in the input image which, using the mapping function, would map exactly on to the selected closest pixel site. That interpolated sample or word, rather than the input sample or word, is sent to the memory 12 for storage in the selected pixel site. Thus, in contrast to the previous approaches described above, a precise desired relationship (as dictated by the mapping function) is maintained between the different positions of the memory 12 and the positions in the input image of the samples stored therein. An interpolation technique as just set forth is described in copending European Patent Application No. EP-A-0 194 066 and in copending UK Patent Application Publication No. GB-A-2 172 167 each applied for by the assignees hereof.

As will be appreciated, the above-described image processing apparatus embodying the invention can be considered as incorporating a filter that is adaptive in the sense that its vertical and horizontal bandwidths are adapted continuously in accordance with the extent of compression and rotation of local areas of the mapped image in a sense to prevent or minimise aliasing. This can lead to the production of high quality visual effects in that the filtering is matched optimally to that required at each point in the image. The preferred implementation of the apparatus can lead to very compact hardware implementation and allows commonality of hardware between vertical and horizontal filtering requirements. The apparatus functions by operating directly on the addresses as they are calculated by the address generator 14, so that the apparatus will operate regardless of the mapping function being used.

As explained above, the preferred apparatus prevents or at least reduces aliasing due to both compression and rotation of the image. There may, however, be applications in which the mapping of the image will involve compression only or rotation only of the image. In these cases, the elements of the apparatus concerned only with bandwidth reduction in response to rotation or compression, respectively, may be omitted.

Although the invention is applicable specifically in the creation of digital video effects, it should be appreciated that the invention is more generally applicable to the processing of digital image signals in a variety of other applications.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An image signal processing apparatus comprising:
   a memory;
   means for generating addresses for allocation to successive words of a digital input signal representing an input image for mapping said image into said memory in such a manner that individual portions of the mapped image stored in said memory may be compressed and rotated with respect to corresponding portions of said input image;

a digital filter of variable bandwidth operative to effect two-dimensional filtering of said input image;

local scaling factor computation means operative to monitor said addresses allocated to successive sets of words of said input signal corresponding to successive local areas of said image and to compute from each said set addresses, for the corresponding set of words, a local scaling factor representing the extent of compression and rotation of the corresponding local area of said image, said local scaling factor computation means comprising (i) means for calculating the angle $O_h$ to the horizontal of a line joining said positions signified by the addresses allocated to said at least two words of said input signal that are relatively horizontally spaced;

(ii) means for calculating the angle $O_v$ to the vertical of a line joining said positions signified by the addresses allocated to said at least two words of said input signal that are relatively vertically spaced;

(iii) means for determining respective values $F(O_h)$ and $F(O_v)$ that indicate the likelihood of aliasing for said calculated angles $O_h$ and $O_v$, respectively; and (iv) means for multiplying said horizontal local scaling factor and said vertical local scaling factor by said values $F(O_h)$ and $F(O_v)$, respectively, and producing products therefrom; and bandwidth control means responsive to successive products from said means for multiplying to vary the bandwidth of said digital filter in a sense to minimize aliasing that would be caused by compression and rotation of said local areas.

2. Apparatus according to claim 1, wherein said local scaling factor computation means is operative to calculate, for each said set of addresses, both a horizontal local scaling factor representing the extent of compression of the corresponding local area of said image in the horizontal direction and a vertical local scaling factor representing the extent of compression of the corresponding local area of said image in the vertical direction, and said bandwidth control means is operative to vary the horizontal and vertical bandwidths of the filter in accordance with said horizontal and vertical local scaling factors, respectively.

3. Apparatus according to claim 2, wherein said local scaling factor computation means is operative to monitor the addresses allocated to a set of at least three words of said input signal that bear a predetermined positional relationship in said input image, said set comprising at least two words that are relatively horizontally spaced in said input signal and at least two words (at least one of which may be common to the first-mentioned at least two words) that are relatively vertically spaced in said input signal.

4. Apparatus according to claim 3, wherein said local scaling factor computation means is operative to compute said horizontal local scaling factor by determining the spacing between the positions signified by the addresses allocated to said at least two words of said input signal that are relatively horizontally spaced and is operative to compute said vertical local scaling factor by determining the spacing between the positions signified by the addresses allocated to said at least two words of said input signal that are relatively vertically spaced.

5. Apparatus according to claim 1, wherein said means for determining said respective values $F(\theta_h)$ and $F(\theta_v)$ comprises look-up tables storing different values of $F(\theta_h)$ and $F(\theta_v)$ for different values of said angles $\theta_h$ and $\theta_v$ and is operative to select appropriate values of $F(\theta_h)$ and $F(\theta_v)$ in accordance with said calculated values of said angles $\theta_h$ and $\theta_v$.

6. Apparatus according to claim 5, wherein said digital filter comprises a finite impulse response filter and said bandwidth control means is operative to apply to said filter, for each set of addresses, a set of weighting coefficients that will cause said filter to have horizontal and vertical bandwidths appropriate to said horizontal and vertical local scaling factors, respectively.

7. Apparatus according to claim 4, wherein said bandwidth control means comprises a look-up table storing a plurality of sets of weighting coefficients for different values of said horizontal and vertical local scaling factors, said bandwidth control means being operative, for each set of addresses, to apply to said filter a set of weighting coefficients appropriate to said values of said horizontal and vertical local scaling factors computed by said local scaling factor computation means.

8. An image signal processing method comprising the steps of:

generating addresses for allocation to successive words of a digital input signal representing an input image for mapping said image into a memory in such a manner that individual portions of the mapped image stored in said memory may be compressed and rotated with respect to corresponding portions of said input image;

effecting two-dimensional filtering of said input image by means of a digital filter of variable bandwidth;

monitoring said addresses allocated to successive local areas of said image and computing from each said set of addresses, for the corresponding set of words, a local scaling factor representing the extent of compression and rotation of the corresponding local area of said image, in which said step of computing comprises the steps of (i) calculating the angle $\theta_h$ to the horizontal of a line joining said positions signified by the addresses allocated to said at least two words of said input signal that are relatively horizontally spaced;

(ii) calculating the angle $\theta_v$ to the vertical of a line joining said positions signified by the addresses allocated to said at least two words of said input signal that are relatively vertically spaced;

(iii) determining respective values $F(\theta_h)$ and $F(\theta_v)$ that indicate the likelihood of aliasing for the calculated angles $\theta_h$ and $\theta_v$, respectively; and (iv) multiplying said horizontal local scaling factor and said vertical local scaling factor by $F(\theta_h)$ and $F(\theta_v)$, respectively, to produce products therefrom; and varying the bandwidth of said digital filter in response to successive products produced by said multiplying in a sense to minimize aliasing that would be caused by compression and rotation of said local areas.

9. A method according to claim 2, wherein the step of computing said local scaling factor comprises, for each said set of addresses, calculating both a horizontal local scaling factor representing the extent of compression of the corresponding local area of said image in the horizontal direction and a vertical local scaling factor representing the extent of compression of the corresponding local area of said image in the vertical direction, and wherein the horizontal and vertical bandwidths of said filter are varied in accordance with said horizontal and vertical local scaling factors, respectively.

10. A method according to claim 9, wherein the step of monitoring said addresses comprises monitoring the addresses allocated to a set of at least three words of said input signal that bear a predetermined positional relationship in said input image, said set comprising at least two words that are relatively horizontally spaced in said input signal and at least two words (at least one of which may be common to the first-mentioned at least two words) that are relatively vertically spaced in said input signal.

11. A method according to claim 10, wherein said horizontal local scaling factor is calculated by determining the spacing between the positions signified by the addresses allocated to said at least two words of said input signal that are relatively horizontally spaced and said vertical local scaling factor is calculated by determining the spacing between the positions signified by the addresses allocated to said at least two words of said input signal that are relatively vertically spaced.

12. A method according to claim 11, wherein different values of $F(\theta_h)$ and $F(\theta_v)$ for different values of said angles $\theta_h$ and $\theta_v$ are stored in lookup tables and appropriate values of $F(\theta_h)$ and $F(\theta_v)$ are selected in accordance with said calculated values of said angles $\theta_h$ and $\theta_v$.

13. A method according to claim 12, wherein said digital filter comprises a finite impulse response filter and its bandwidth is varied by applying to said filter, for each set of addresses, a set of weighting coefficients that will cause said filter to have horizontal and vertical bandwidths appropriate to said horizontal and vertical local scaling factors, respectively.

14. A method according to claim 13, wherein a plurality of sets of weighting coefficients for different values of said horizontal and vertical local scaling factors are stored in a look-up table and, for each set of addresses, a set of weighting coefficients appropriate to said calculated values of the horizontal and vertical local scaling factors are applied to said filter.

* * * * *